Dec. 10, 1946. E. H. SHARKEY 2,412,231
ELECTRONIC TUBE TESTING APPARATUS
Filed Oct. 28, 1942 2 Sheets-Sheet 1

INVENTOR
E. H. SHARKEY
BY
H. A. Burgess
ATTORNEY

Dec. 10, 1946.  E. H. SHARKEY  2,412,231
ELECTRONIC TUBE TESTING APPARATUS
Filed Oct. 28, 1942  2 Sheets-Sheet 2

INVENTOR
E. H. SHARKEY
BY
ATTORNEY

Patented Dec. 10, 1946

2,412,231

UNITED STATES PATENT OFFICE 2,412,231

ELECTRONIC TUBE TESTING APPARATUS

Edward H. Sharkey, Glen Ridge, N. J., assignor to Bell Telephone Laboratories, Incorporated, New York, N. Y., a corporation of New York Application October 28, 1942, Serial No. 463,705

16 Claims. (Cl. 315—370)

This invention relates to electronic tube testing apparatus, and more particularly to such apparatus embodying a cathode ray oscilloscope for illustrating a plurality of different characteristics of individual electronic tubes, with reference to a given set of circuit parameters.

Heretofore, one type of test for selecting suitable electronic tubes for use in electrical circuits was based on the rate of change of plate current with respect to variations of control grid voltage for a testing set of circuit parameters. The testing apparatus utilized for this purpose generally comprised several sources of energizing voltage, means to change the magnitudes of such voltages on a manual basis, and suitable meters of the voltmeter and milliammeter type both of which embodied movable indicators. As a consequence, numerous tested and approved tubes were subsequently found to perform unsatisfactorily when the individual tubes were selected at random and embodied in circuits whose parameters were different from the testing set of circuit parameters; and a further selection of the tested and approved tubes on a trial basis was then necessary in order to find a tube that gave a tolerable performance with the particular set of circuit parameters with which the tube was to be ultimately utilized. The foregoing type of test therefore provided information only in the respects previously indicated for the testing set of circuit parameters. The present invention is concerned with apparatus for testing electronic tubes to ascertain the optimum circuit parameters for use therewith.

The main object of the invention is to determine whether individual electronic tubes are suitable for use with a given set of circuit parameters.

Another object is to determine the optimum circuit parameters for individual electrodes of multielectrode electronic tubes.

A further object is to ascertain a plurality of different characteristics involving individual electrodes of multielectrode electronic tubes for a given set of circuit parameters.

A still further object is to provide apparatus for expeditiously testing multielectrode electronic tubes, with reference to a given set of circuit parameters, on a production basis at substantially reduced cost.

In a specific embodiment, the present invention comprises in the case of a multielectrode electronic tube to be tested, a source of direct potential disposed in series with each electrode thereof, a source of electrical energy of certain frequency applied to the input circuit of the tube, and in the output circuit of the tube a load resistor with which are connected in sequence a first high-pass filter, a first amplifier, a second high-pass filter, a second amplifier, and the vertical deflecting plates of a conventional cathode ray oscilloscope. Interposed in the input circuit of the tube in series with the certain energy source is another source of electrical energy having a different frequency and varying in both polarity and magnitude. The latter source is also connected through an amplifier to the horizontal deflecting plates of the oscilloscope.

In operation of the specific embodiment of the invention, the circuit parameters of the tube are initially proportioned to simulate substantially the circuit parameters with which the tube is to be ultimately used. The certain electrical energy is then reproduced across the load resistor, and thereafter applied through the filters (to remove components of the different frequency) and amplifiers to the vertical deflecting plates of the oscilloscope. At the same time, one portion of the different electrical energy causes the control grid of the tube to assume a bias determined by its instantaneous magnitude and polarity; and another portion of the different electrical energy causes the certain electrical energy reproduced in the load resistor to spread out on the oscilloscope screen along a horizontal axis such that proper (+) and (—) oscilloscope spot displacements are effected for the corresponding (+) and (—) varying magnitudes of the different electrical energy applied to the control grid. As so spread out on the oscilloscope screen, the trace appears as an envelope whose height at an instantaneous magnitude of control grid biasing voltage is proportional to the gain of the tube at such magnitude of biasing voltage. This trace on the oscilloscope screen provides the gain versus biasing voltage characteristic of the tube under test, with reference to the control grid and the circuit parameters used in the test.

In accordance with the invention, the following electronic tube characteristics may be expeditiously ascertained on the oscilloscope screen:

1. Gain versus individual electrode voltages.
2. Transconductance versus individual electrode voltages.
3. Modulation measurement.
4. Distortion measurement.
5. Cathode emission measurements.
6. Variations of control grid cathode contact potential versus heater potential.
7. Measurement of interelectrode $\mu$.

8. Plate current versus individual electrode voltages.

9. General tube checking.

The invention will be more readily understood from the following description taken together with the accompanying drawings in which.

Figure 3:
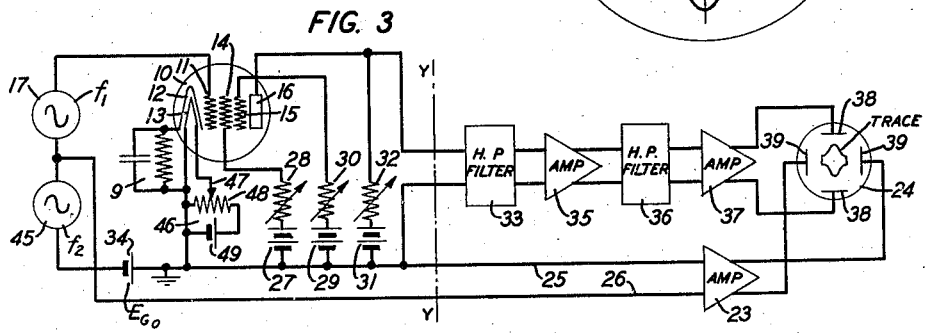
Fig. 3 is a schematic circuit showing the specific embodiment of the invention of Fig. 1 illustrated in a slightly different form.
Figure 5:
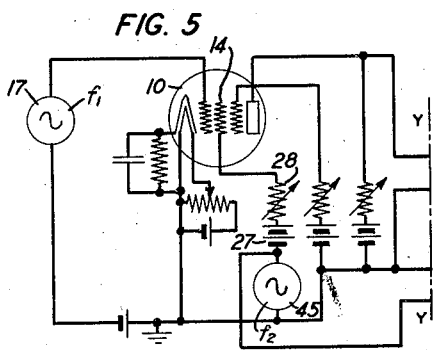
Figure 6:
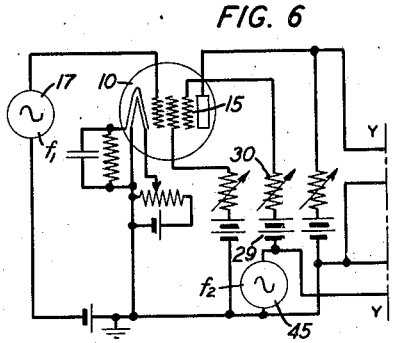
Figure 7:
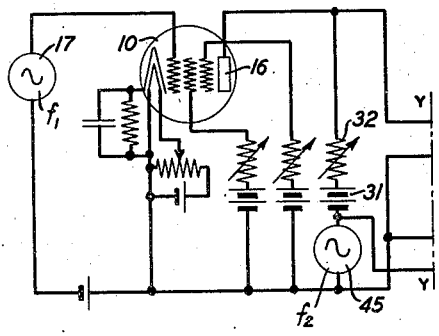

Figs. 5, 6 and 7 are partial schematic circuits illustrating modifications of the invention shown in Fig. 3; and Figs. 8, 9, 10 and 11 are enlarged oscilloscope patterns of certain action in Figs. 3, 5, 6 and 7.

The same reference numerals serve to designate identical elements appearing in the several figures of the drawings.

1. *Gain versus individual electrode voltages*

Figure 1:
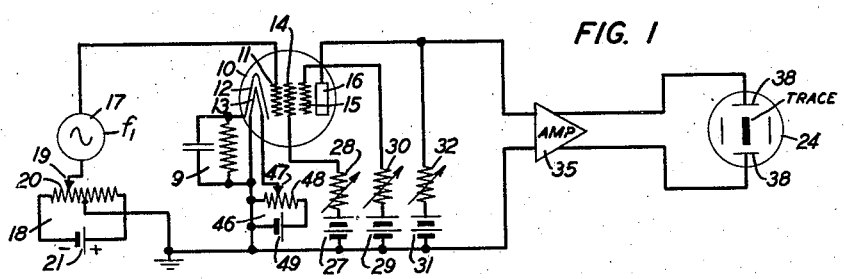
Fig. 1 is a schematic circuit showing a specific embodiment of the invention in its simplest form.

Referring to Fig. 1, an electron discharge tube 10 whose electrical characteristics are to be ascertained in the respects to be mentioned hereinafter, comprises a control grid 11, cathode 12, heater 13, screen grid 14, suppressor grid 15 and anode 16. Connected across the control grid 11 and the negative terminal of an R-C network 9 disposed in series with the cathode 12 is a source 17 of an electrical sinusoidal wave $f_1$ whose frequency lies in a range of the order of 2,000 to 10,000 cycles per second and which possesses a substantially uniform magnitude. Disposed in series with the wave source 17 is a source 18 of direct potential arranged such that varying magnitudes of positive and negative potential may be obtained by manually actuating a movable contact 19 along a resistor 20 which is energized by a source 21 of direct potential. This potential is utilized to bias the control grid 11 with respect to cathode 12 in a manner that will be subsequently described.

A source 27 of direct potential and a manually variable resistor 28 in series with the screen grid 14 serve to energize the latter with a variable voltage; a source 29 of direct potential and a manually variable resistor 30 in series with the suppressor grid 15 serve to energize the latter with a variable voltage; and a source 31 of direct potential and a manually variable resistor 32 in series with the anode 16 serve to energize the latter to institute a flow of space current in the anode cathode circuit and to provide a load in the anode circuit, respectively. Across the load resistor 32 is connected the input of an amplifier 35 whose output is supplied to a pair of vertical deflecting plates 38, 38 of a cathode ray oscilloscope 24 of conventional structure.

In the operation of Fig. 1, the impedance of the load resistor 32 at the frequency $f_1$ is set approximately equal to the impedance of the plate load of the circuit in which the tube 10 under test is to be ultimately used. This is true whether the circuit load impedance is complex or resistive. The value of the plate load impedance is determined mostly by overall circuit considerations, and only to a relatively small degree by the tube 10 under test. The variable resistors 28 and 30 are manually adjusted to apply voltage to the respective screen and suppressor grids with magnitudes that are approximately equal to those with which the tube 10 under test is to be ultimately used. The direct potential biasing arrangement previously mentioned is also capable of providing (+) and (−) swings to extents that approximate those with which the tube 10 under test is to be ultimately used. The cathode heater 13 is also initially energized from source 46 of direct potential to an extent that approximates that with which the tube 10 under test is to be ultimately used. Such direct potential is supplied by manually actuating contact 47 over resistor 48 connected across source 49 of direct potential. Thus, the tube 10 to be tested is embodied in a test circuit whose parameters are initially proportioned to simulate substantially the circuit parameters with which the tube 10 is to be ultimately used.

The sinusoidal wave $f_1$ applied to the input of the tube 10 is effectively reproduced across the load resistor 32 in the well-known manner with a magnitude which is equal to the gain of the tube 10 multiplied by the magnitude of the voltage of the sinusoidal wave $f_1$. When the peak magnitude of the voltage of the sinusoidal wave $f_1$ is relatively small and constant, the magnitude of the output voltage produced across the load resistor 32 is proportional to the gain of the tube 10, which gain is determined by the magnitude and sign of the biasing voltage applied to the control grid 11, all other parameters remaining constant. Therefore, the arrangement of varying the magnitude and polarity of the biasing voltage applied to the control grid 11 by manually actuating the contact 19 along the resistance 20 causes the magnitude of the output voltage $f_1$ reproduced across the load resistor 32 to vary accordingly. Hence, when the magnitude of the biasing voltage applied to the control grid 11 is caused to vary (cyclically) between certain positive and negative values, the magnitude of the output voltage produced across the load resistor 32 is also caused to vary in like manner.

Figure 2:
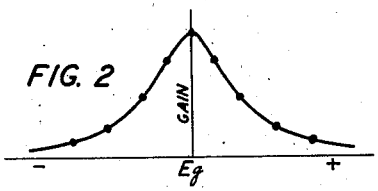
Fig. 2 is a curve representing certain action in Fig. 1.

Thus, the instantaneous values of the output voltage $f_1$ reproduced across the load resistor 32 is proportional to the gain of the tube 10 for corresponding instantaneous magnitudes and polarities of the biasing voltage effectively applied to the control grid 11, in the manner hereinbefore described, and are illustrated by changes of the height of the trace on the oscilloscope screen in Fig. 1. In accomplishing the foregoing, the magnitude of the voltage of the wave $f_1$ should be sufficiently small so that a constant value of $$\frac{dI_p}{dE_g}$$

of the tube 10 is truly utilized, which $$\frac{dI_p}{dE_g}$$

in general varies substantially rapidly with changes of the magnitude of the biasing voltage impressed on the control grid 11 from the source 18 in the manner above explained. The height of this vertical trace for various positive and negative values of the biasing voltage applied to the control grid 11 can be translated into the point-by-point gain versus control grid biasing voltage characteristic, with reference to the testing set of circuit parameters, as shown in Fig. 2. This curve shows that when the grid biasing voltage is varied through different magnitudes between relatively large and equal positive and negative limits, the height of the trace on the oscilloscope screen in Fig. 1 is provided with corresponding positive and negative values.

Fig. 3 is identical with Fig. 1 except a source 45 of an alternating wave $f_2$, whose fresuency is of the order of a few cycles per second, is interposed in Fig. 3 in the input circuit of the tube 10 in series with the source 17 of the wave $f_1$ and in place of the direct current source 18 in Fig. 1; and high-pass filters 33 and 36 and amplifier 37 are interposed together with the amplifier 35 in sequence between the load 32 and the vertical deflecting plates 38, 38 of the oscilloscope 24. The functions of the added filters and amplifier 37 will be hereinafter pointed out. In effect, the source 45 of the wave $f_2$ is substituted for the manually operated biasing source 18 of Fig. 1 so as to swing the biasing potential automatically and continuously through certain different values lying between equal positive and negative limits. The source 45 is also connected through an amplifier 23 embodied in leads 25 and 26 to the horizontal deflecting plates 39, 39 of the oscilloscope 24. A source 34 of direct potential impresses a fixed negative bias $Eg_0$ on the control grid 11 of the tube 10 under test. The wave $f_2$ has a peak magnitude which is substantially equal to the maximum desired swing of the grid biasing potential for both positive and negative polarities.

In the operation of Fig. 3, the circuit parameters are initially proportioned to simulate substantially the circuit parameters with which the tube 10 under test is to be ultimately used, as in the case of the operation of Fig. 1. The operation of Fig. 3 is substantially identical with that of Fig. 1, and will now be explained. The wave $f_1$ applied to the input circuit of the tube 10 is reproduced across the load resistor 32 with a magnitude which is equal to the gain of the tube 10 multiplied by the voltage magnitude of the wave $f_1$ or which is proportional to the gain of the tube 10, assuming the amplitude of the wave $f_1$ to be constant. As previously pointed out in connection with Fig. 1, the gain of the tube 10, Fig. 3, is determined by the magnitude and polarity of the biasing voltage $f_2$ applied to its control grid 11, assuming all other parameters of Fig. 3 to remain constant. As the sweep voltage $f_2$ applied to the horizontal deflecting plates 39, 39 of the oscilloscope 24, Fig. 3, is synchronized with the biasing wave $f_2$ impressed on the control grid 11, the vertical trace on the oscilloscope screen, Fig. 3, is caused to move in a horizontal path as the voltage $f_2$ changes in both magnitude and polarity. Such horizontal movement is proportional to the instantaneous magnitudes and polarities of the biasing voltage $f_2$ impressed on the control grid 11; and such horizontal movement is given proper (+) and (−) displacements with respect to the horizontal axis for corresponding magnitudes and polarities of the biasing voltage $f_2$. As a consequence, the trace on the oscilloscope screen provides the gain versus control grid biasing voltage characteristic spread out in the proper proportions. As spread out, such trace will appear as an envelope whose height at an instantaneous value of sweep voltage $f_2$ is proportional to the gain of the tube 10 at the corresponding instantaneous magnitude and polarity of the control grid biasing voltage $f_2$, and is represented by the trace on the oscilloscope screen in Fig. 3.

The foregoing operation of Fig. 3 is substantially true when the biasing wave $f_2$ has a frequency of the order of a few cycles per second, as the biasing wave $f_2$ reproduced across the load resistor 32 is not normally transmitted through ordinary amplifiers when it is of such low order of frequency. However, when the biasing wave $f_2$ possesses a relatively higher frequency, say for example of the order of 60 cycles per second, the amplified biasing wave $f_2$ would then be transmitted through ordinary amplifiers, whereby distortion would be introduced into the trace produced on the oscilloscope screen, Fig. 3. Such distortion is eliminated in a manner that will now be explained.

Let it be assumed, in Fig. 3, that the wave $f_1$ is a carrier wave having a frequency of the order of 10,000 cycles per second, and the wave $f_2$ is a signal wave having a frequency of the order of 60 cycles per second. In such case, the magnitude of the carrier wave $f_1$ should be as small as practicable, say for example of the order of 0.03 peak volt in order that the true $$\frac{dI_p}{dE_g}$$

of the tube 10 be measured; and the magnitude of the signal wave $f_2$ should be of the order of ±2.0 peak volts which in most voltage amplifier tubes is sufficient to cause the tube 10 to swing from anode current cut-off to anode current saturation. Under these assumed conditions, a relatively high degree of modulation is caused to occur across the load resistor 32 in the output of the tube 10; and as two discrete waves of frequencies $f_1$ and $f_2$ are supplied to the input of the tube 10, the latter is effectively functioning as a non-linear modulator, producing at least both second and third order modulation products, including harmonics of both the waves $f_1$ and $f_2$.

As the magnitude of the carrier wave $f_1$ is assumed to be relatively small as compared with the magnitude of the signal wave $f_2$ as above pointed out, the amplitudes of the modulation products having frequencies of the order of the frequency of the carrier wave $f_1$ or higher are relatively small as compared with the amplitudes of the lower frequency modulation products including the signal wave $f_2$ and harmonics thereof. As the carrier wave $f_1$, modulated by the signal wave $f_2$ (including harmonics of the latter), is subsequently amplified, and thereafter applied to the vertical deflecting plates 38, 38 of the oscilloscope 24 for indicating purposes, it is apparent that any portion of the signal wave $f_2$, which is also amplified and applied to these deflecting plates at the same time, would tend to distort the trace produced on the oscilloscope screen. Hence, any voltages involving the signal wave $f_2$ or harmonics thereof and appearing across the load resistor 32 should be rendered ineffective in so far as their action on the vertical deflecting plates of the oscilloscope 24 is concerned so as to avoid distortion of the trace produced on the screen thereof.

Consequently, the signal wave $f_2$ and harmonics thereof are substantially entirely attenuated by a first high-pass filter 33 interposed between the load resistor 32 and amplifier 35, and a second high-pass filter 36 disposed intermediate the amplifier 35 and amplifier 37 whose output is directly supplied to the vertical deflecting plates 38, 38 of the oscilloscope 24, Fig. 3. The filter 33 does not impair the interstage impedance as seen by the output of the tube 10; and the wave $f_2$ including the harmonics thereof are precluded by the filter 33 from overloading the amplifier 35. In addition, the filters 33 and 36 present substantially no attenuation or phase shift to the signal modulated carrier wave $f_1$, that is, the 10 kilocycle envelope, applied to the vertical deflecting plates 38, 38 of the oscilloscope 24, in Fig. 3.

Thus, the outline of the 10 kilocycle envelope produced on the oscilloscope screen, Fig. 3 (enlarged in Fig. 4) indicates the gain versus control grid biasing voltage characteristic of the individual tube 10, being tested for the particular set of circuit parameters hereinbefore identified. When the oscilloscope screen also carries a standard characteristic fixedly located thereon and involving the same coordinates and circuit parameters, comparison of the indicated and standard characteristics will instantly indicate whether the particular tube 10 under test possesses the proper characteristic. Such standard characteristic would be substantially identical with that shown in Fig. 4. In Fig. 3, the biasing wave $f_2$ may be of any shape for the reason that the source 45 of this wave is connected simultaneously to both the control grid 11 of the tube 10 and the horizontal deflecting plates 39, 39 of the oscilloscope 24. This serves to synchronize the wave $f_2$ and the trace on the oscilloscope 24.

Figure 8:
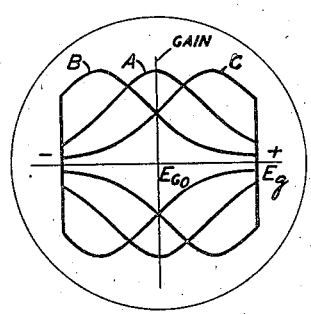

Referring to Fig. 8, the envelopes A, B and C show the gain versus control grid biasing voltage characteristics (at the fixed grid bias $E_{G_0}$) of three different tubes 10 comprising identical types and tested in Fig. 3 under the same set of circuit parameters. Envelope A indicates a tube 10 possessing the ideal characteristic for the given set of circuit parameters which characteristic is substantially identical with the standard characteristic located fixedly on the oscilloscope screen in Fig. 3 as above pointed out. Envelope B indicates a tube 10 whose rate of change of gain is relatively large, due to its contact potential being lower than average. Envelope C indicates a tube 10 whose rate of change of gain is also relatively large but in the opposite sense due to its contact potential being above average. Hence, the tube 10 producing the envelope A is preferred over the two tubes 10 producing the envelopes B and C, as both latter tubes have less gain than the former tube, and in addition both latter tubes have more variation of gain with changes of the control grid voltage parameter than the preferred tube. Consequently, the circuit parameters causing the particular tube 10 to produce the envelope A, Fig. 8, are optimum for that particular tube 10; and the same circuit parameters causing the two other tubes 10 to produce the envelopes B and C are not the optimum therefor.

In Fig. 5 the circuit portion shown is similar to the circuit portion shown to the left of the line Y—Y in Fig. 3, except the source 45 of the signal or biasing wave $f_2$ is interposed in series with the screen grid 14. The source 27 of direct potential and variable resistor 28 supply a fixed bias $E_{SCR_0}$ to the screen grid 14. It will be understood that the circuit portion, Fig. 5, is to be substituted for the circuit portion shown to the left of the line Y—Y, Fig. 3. In the manner explained above concerning Fig. 3, the circuit combination of Figs. 3 and 5 provides on the screen of the oscilloscope 24 the portions of the 10 kilocycle envelope D, Fig. 9, to indicate the gain versus screen grid voltage characteristic of the tube 10 under test, with reference to the circuit paramenters hereinbefore identified. As the envelope D in its entirety extending from cut-off to saturation would require a sweep voltage $f_2$ of a much larger magnitude than the 2.0 volts, assumed for the purpose of this illustration, only a small portion of envelope D appears in Fig. 9. If the sweep voltage $f_2$ were of the proper magnitude, the envelope D, Fig. 9, would possess the general configuration of the envelope A, Fig. 8. Obviously the oscilloscope screen is too small to show the curve D in its entirety. Hence in Fig. 9, the envelope portions D show the gain versus screen grid voltage characteristic of the tube 10 operating in a circuit of optimum parameters. This characteristic may be compared with a standard characteristic fixedly located on the oscilloscope screen and involving the same coordinates and circuit parameters for ascertaining whether the particular tube 10 under test possesses the proper characteristic. Such standard characteristic would be substantially identical with the envelope portions D shown in Fig. 9.

Figure 9:
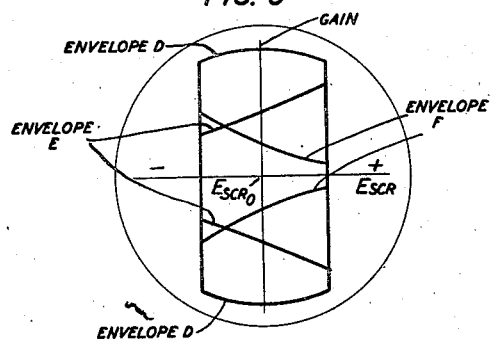

Referring to Fig. 9, the envelope portions D, E and F show the gain versus screen grid voltage characteristics of three different tubes 10 comprising identical types and tested in Figs. 3 and 5 with the same set of circuit parameters. Envelope portion D represents a tube 10 possessing the ideal characteristic as above pointed out. Envelope portion E indicates a tube 10 whose rate of change of gain with screen voltage is relatively large, due to its grid contact potential being below average. Envelope portion F shows a tube 10 whose rate of change of gain is relatively large, due to its grid contact potential being lower than average. Hence, the tube 10 producing the envelope portion D is to be preferred over the two tubes 10 producing the envelope portions E and F, as both latter tubes have less gain than the former tube, and further both latter tubes have more variation of gain with changes of the screen voltage parameter than the former tube has. Accordingly, the circuit parameters causing the particular tube 10 to produce the envelope D in Fig. 9 are optimum for that particular tube 10; while the same circuit parameters causing the two other tubes 10 to produce the envelopes E and F are obviously not optimum for either of the latter two tubes.

At this point, it should be mentioned that a tube 10, which provides the preferred characteristic A in Fig. 8, when tested in the circuit of Fig. 3, would also provide the preferred characteristic D when tested in Fig. 5. This is so for the reason that the tests according to both Figs. 3 and 5 are essentially the same, assuming the other circuit parameters are identical including the fixed control grid voltage $E_{G_0}$ and the screen grid voltage $E_{SCR_0}$. The only digerence between the tests of Figs. 3 and 5 is the magnitude of the sweep voltage $f_2$ required to produce any portion of the envelopes D, E and F on the screen of the oscilloscope 24, the ratio of the sweep voltage $f_2$ in Figs. 3 and 5 being equal to the screen grid versus control grid mu of the indivdual tubes 10. The above identity of the curves traced on the screen of the oscilloscope 24 is as good as is the actual constancy of the previously mentioned mu with variations of circuit parameters.

Figure 10:
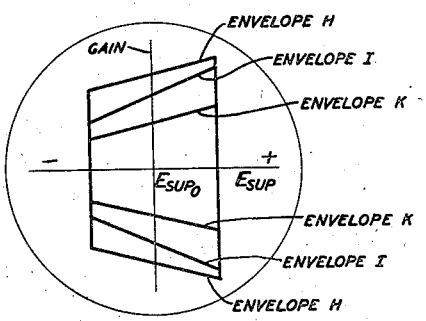

In Fig. 6 the circuit portion shown is similar to the circuit portion shown to the left of the line Y—Y in Fig. 3, except the source 45 of the signal wave $f_2$ is interposed in series with the suppressor grid 15, and the source 29 of direct potential and resistor 30 supply a fixed bias $E_{SUP_0}$ to the latter grid. It will be understood that the circuit portion of Fig. 6 is to be substituted for the circuit portion shown to the left of the line Y—Y in Fig. 3. In the manner described hereinbefore relative to Fig. 3, the circuit combination of Figs. 3 and 6 provides on the screen of the oscilloscope 24 the portions of the envelope H to indicate the gain versus suppressor grid voltage characteristic shown in Fig. 10, with reference to the circuit parameters hereinbefore identified. As the envelope H in its entirety extending from cut-off to saturation requires a much larger magnitude of sweep voltage $f_2$ than the ±2.0 volts, assumed for the purpose of this illustration, only a small portion of the envelope H appears in Fig. 10. If the sweep wave $f_2$ were of the proper magnitude, the envelope portions H fully extended would have the general shape of the envelope A in Fig. 8. Obviously, the oscilloscope screen is too small to show the envelope H in its entirety. Fig. 10 also shows curve portions I and K obtained with two other tubes 10 tested in Fig. 6 with the same set of circuit parameters. These characteristics are useful in determining whether a particular tube 10 tested in Fig. 6 will be satisfactory when utilized as a suppressor grid modulator and may be compared with a standard characteristic fixedly located on the oscilloscope screen, Fig. 10, and involving the same coordinates and circuit parameters. Such standard characteristic should be substantially identical with the envelope portions H, Fig. 10.

Referring to Fig. 10, the envelope portions H, I, and K show the gain versus suppressor grid voltage characteristics of three different tubes 10 comprising identical types and tested in Fig. 6 with the same set of circuit parameters. Envelope portion H indicates a tube 10 possessing the ideal characteristic when compared with the standard characteristic, that is, constancy of rate of change of gain. Envelope portions I and K show individual tubes 10 under test whose constancy of rate of change of gain is relatively poor. Consequently, the circuit parameters causing the particular tube 10 to produce the envelope portions H, Fig. 10, are optimum for that particular tube 10; while the same circuit parameters causing the two other tubes 10 to produce the envelope portions I and K are obviously not optimum for either of the latter two tubes.

In Fig. 7 the circuit portion shown is similar to the circuit portion shown to the left of the line Y—Y in Fig. 3, except the source 45 of the signal wave $f_2$ is now interposed in series with the anode 16, and the source 31 of direct potential supplies a certain magnitude of positive potential $E_{P_0}$ to the anode 16 through the load resistor 32. It will be understood that the circuit portion of Fig. 7 is to be substituted for the circuit portion shown to the left of the line Y—Y in Fig. 3. In the manner pointed out previously regarding Fig. 3, the circuit combination of Figs. 3 and 7 provides on the screen of the oscilloscope 24 the portions of the envelope M to indicate the gain versus anode (plate) voltage characteristic shown in Fig. 11, with reference to the circuit parameters hereinbefore identified. As the envelope M in its entirety extending from cut-off to saturation requires a much larger magnitude of sweep voltage $f_2$ than the ±2.0 volts assumed for the purpose of this illustration, only a small portion of the envelope M appears in Fig. 11. If the sweep voltage $f_2$ were of the proper magnitude, the envelope portions M fully extended would have the general shape of the envelope A, Fig. 8. Obviously, the oscilloscope screen is too small to illustrate the envelope M in its entirety. Thus, in Fig. 11 the envelope portions M represent the gain versus anode (plate) voltage characteristic of the tube 10 operating in a circuit of optimum parameters, and for this purpose may be compared with a standard characteristic fixedly positioned on the oscilloscope screen in Fig. 3 and involving the same coordinates and circuit parameters, for ascertaining whether the particular tube 10 under test possesses the proper characteristic. Such standard characteristic would be substantially identical with the envelope portions M, Fig. 11.

Figure 11:
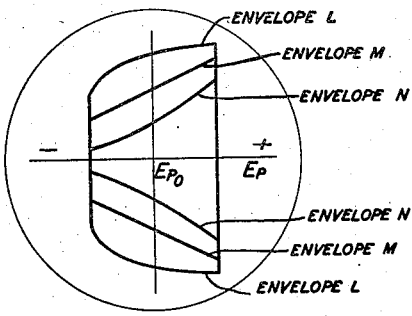

Referring to Fig. 11, the envelope portions L, M and N show the gain versus anode (plate) voltage characteristic of three different tubes 10 comprising identical types and tested in Fig. 7 with the same circuit parameters. This type of characteristic is useful in determining conditions for a tube intended for use as a plate modulated modulator. Envelope portion M represents a tube 10 whose rate of change of gain with plate voltage is relatively constant, and therefore represents the ideal characteristic for this use. The tube 10 producing the envelope portion M is to be preferred over the two tubes 10 producing the envelope portions L and N, as both latter tubes have more variation in gain change than the former tube and would therefore cause distortion when used as plate modulated modulators, with the circuit parameters equivalent to those used in the test according to Fig. 7.

It is to be noted that while the three characteristics illustrated in each of Figs 8, 9, 10 and 11 were identified with three different tubes 10 tested with the same set of circuit parameters, these characteristics could also illustrate one tube 10 tested with three different sets of circuit parameters. In the first instance, the characteristics would indicate whether individual tubes 10 would be useful with a given set of circuit parameters; and in the second instance, the characteristic would indicate what adjustments in the circuit parameters would be required in order to provide individual tubes 10 with useful characteristics.

2. *Transconductance versus individual electrode voltages*

To measure interelectrode transconductance, the magnitude of the alternating current resistance of the resistor 32, Fig. 3, is made small relative to the magnitude of the internal alternating current resistance of the anode 16 of the tube 10. Transconductance may be expressed as $$\frac{dI_p}{dE_{e1}}_{(E_p=k)}$$

where $I_p$ is anode current, $E_{e1}$ is the varying voltage applied to a particular electrode of the tube 10, and $E_p$ is a constant. Utilizing the arrangements of Figs. 3, 5, 6 and 7, the transconductance versus biasing voltage characteristics of the individual electrodes of the tube 10 may also be expeditiously produced on the screen of the oscilloscope 24, Fig. 3. In this connection transconductance is substituted for the gain coordinate of the wave pattern in Figs. 3, 4, 8, 9, 10 and 11, and the operations of Figs. 3, 5, 6 and 7 repeated as above described. Due to the small magnitude of output voltage produced across the load resistor 32, further amplifier gain will be required to effect such measurements, and is obtained by appropriately adjusting the gain of either or both the amplifiers 35 and 37.

3. *Modulation measurement*

The basic requirement for linear modulation is that the gain of the tube 10 when used as a modulator be linear with respect to a biasing voltage whose source is disposed in series with an individual electrode of the tube 10. Utilizing the arrangements of Figs. 3, 5, 6 and 7, the gain versus biasing voltage characteristics, Figs. 4, 8, 9, 10 and 11 of individual electrodes of the tube 10, are produced on the oscilloscope screen in the manner previously pointed out in connection with Figs. 3, 5, 6 and 7, respectively. The limiting values of the biasing voltage swing required to effect linear modulation and allowable percentage modulation for any tolerable percentage distortion can be readily obtained from the linear portion of the characteristics, Figs. 3, 4, 8, 9, 10 and 11, by positioning lines with the proper slope on the oscilloscope screen and employing variable gain in the path extending from the wave ($f_2$) source 45, to the vertical deflecting plates 38, 38 of the oscilloscope 24. Thereafter, circuit parameters may be set up in accordance with such biasing voltage swing to effect linear modulation in individual tubes 10 with respect to individual electrodes by causing the traces produced on the oscilloscope screen to coincide substantially with the lines initially positioned thereon.

4. *Distortion measurements*

Figure 4:
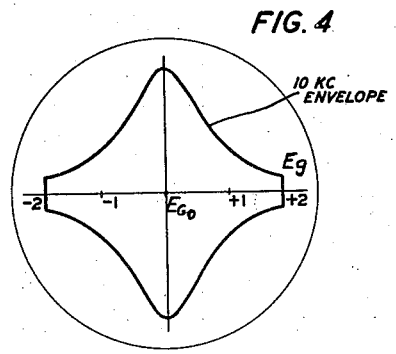
Fig. 4 is an enlarged oscilloscope pattern of certain action in Fig. 3.

As the gain versus control grid biasing voltage characteristic according to Figs. 3 and 4 is also a measure of the distortion encountered when a signal is applied to the control grid of the tube 10, the optimum operating magnitude of control grid biasing voltage for least distortion in individual tubes 10 can therefore be readily ascertained from this characteristic. Such magnitude is that which provides the maximum gain of the tube 10, and corresponds to the point of reversal of the curvature of the $$\frac{I_p}{E_g}$$

characteristic shown in Figs. 3 and 4. From this characteristic, the percentage distortion for a swing of the control grid biasing voltage through any positive and negative limits can be readily estimated by correlation with the usual distortion calculation from the plate current $I_p$, and control grid biasing voltage $E_g$ curves.

5. *Cathode emission measurements*

When the source 45 of biasing voltage $f_2$ is disposed in series with the control grid 11, Fig. 3, the peak gain of the tube 10, regardless of the magnitude and sign of the biasing voltage $E_{G_0}$ produced by the source 34, is a function of the direct current voltage supplied by source 46 to the heater 13 in a manner that will be presently explained. The characteristic in Fig. 4 shows at which magnitude of heater voltage the saturation of the cathode 12 first occurs for the circuit parameters employed in the circuit of Fig. 3 and above identified. In other words, at or above a critical magnitude of the voltage supplied to the heater 13, the peak gain of an individual tube 10 will become relatively constant for specific circuit parameters. Such critical magnitude of heater voltage may be ascertained according to Fig. 3 by manually actuating movable contact 47 along a resistor 48 which is energized by source 49 of direct current voltage. In filament type tubes, the peak gain is substantially constant above and down to the critical magnitude of filament voltage, but falls off sharply to zero for a voltage decreasing from such critical magnitude of cathode voltage down to zero. In cathode type tubes, the peak in general rises slowly for a voltage increasing above such critical magnitude of cathode voltage.

6. *Variation of control grid-cathode contact potential versus heater potential*

In Fig. 3 the load resistor 32 is provided with an alternating current resistance value which is of the order of magnitude of the value of the internal alternating current resistance of the anode 16 of the tube 10 so that the peak of the gain versus control grid biasing voltage characteristic, Figs. 3 and 4, is relatively sharp. As the magnitude of the control grid biasing voltage at such peak gain can be readily ascertained with a high degree of accuracy by using a fixed calibration on the horizontal axis of the oscilloscope screen, Fig. 4, which calibration is determined by direct current measurements of various fixed values of control grid bias, the magnitude of the control grid biasing voltage required to provide other individual tubes substantially with the same peak gain can be expeditiously ascertained by maintaining in Fig. 3 the same fixed circuit parameters. As variations of the magnitude of the control grid biasing voltage affects both the transconductance and gain available in individual tubes 10 under a condition of other fixed circuit parameters, such variations with respect to the predetermined or standard curve thereof, should be ascertained before a tube 10 is embodied in a circuit of particular parameters. Knowing the optimum magnitude of the control grid biasing voltage in advance, as the mean or average value determined by tests on a representative group of tubes for a given set of circuit parameters, enables the testing of all tubes with a certain set of circuit parameters so as to assure that only tubes giving optimum performance will be employed therewith, and also to assure that of a group of tubes 10 the greatest percentage thereof will be usable.

7. *Measurement of interelectrode* $\mu$

Some of the interelectrode $\mu$'s of multielectrode tube 10 can be readily ascertained with the circuit of Fig. 3. Since, by definition, $\mu$ is the ratio of two electrode voltage changes required to produce a given plate current change in a tube and the characteristic obtained on the screen is a measure of $$\frac{dI_p}{dE_g}$$

at that bias value, $\mu$'s may be determined by measuring the individual electrode voltage changes required to move the gain versus grid voltage characteristic along the grid bias axis an equal and opposite amount. For example, the control grid versus screen grid $\mu$ can be ascertained by observing the ratio of the direct current voltage variation of the screen grid 14, effected by adjusting the variable resistor 28, and of the control grid biasing voltage required to maintain the characteristic of Figs. 3 and 4 in the same position, relative to a certain magnitude of control grid biasing voltage. In like manner, the control grid versus suppressor grid $\mu$ and the control grid versus plate $\mu$ can be obtained. Since most of the $\mu$'s of a multielectrode tube are not constant with parameters, the parameters used should be noted in any determination of $\mu$.

8. *Plate current versus individual electrode voltages*

In Figs. 3, 5, 6 and 7, the source 17 is adjusted such that the carrier wave $f_1$ is provided with a zero value; the source 45 of the signal wave $f_2$ is interposed in series with a preselected individual electrode of the tube 10; and the filters 33 and 36 disconnected from the respective circuits. In this case, the wave $f_2$ is reproduced across the lead 32. Now the oscilloscope actuated by the reproduced wave $f_2$ and a portion of the original wave $f_2$ will indicate characteristics comprising plate current versus the wave $f_2$ applied to the individual electrodes. Further, by setting the load resistor 32 at an alternating current resistance value which is small compared to the value of the internal plate, alternating current resistance of the tube 10 under test, the well-known published $$\frac{I_p}{E_g}_{(E_p=k)}$$

transfer characteristic is represented on the screen of the oscilloscope, Fig. 3. By suitable switching arrangements, not shown, the transfer characteristic between any two electrodes may be represented on the oscilloscope screen.

9. *General tube checking*

An important feature embodied in the several figures of the drawings discussed above is testing individual tubes 10 for use with a fixed set of circuit parameters in order to select tubes that will give optimum performance therewith. In circuit embodiments, in which variations of the supply voltages to individual electrodes are unavoidable, it is important to know the rate of change of gain for slight variations of such voltages. For example, variations of the heater voltage will, in general, change the operating point and gain of the tube, although the latter may still be far above the point of cathode current saturation. It is therefore important to know in advance that the rate of change of gain of a certain tube 10 for an anticipated small variation of the supply voltages to individual electrodes thereof will be as small as possible. In testing electronic tubes in this respect, the circuit parameters for the individual electrodes are determined by tests of a representative group of tubes. For example, Fig. 8 shows the gain versus control grid biasing voltage characteristic for three different tubes 10 tested with the same circuit parameters. As pointed out above, the tube 10 having the characteristic A is preferred as its rate of change of gain with control grid voltage variations is the smallest of the three tubes. Similar tests may be carried out according to Figs. 9, 10 and 11 to determine stability of gain with variations of other electrode voltages, and a set of parameters obtained to provide least variation of gain with variations of all supply voltages to the individual electrodes.

What is claimed is:

1. In combination, in a device for indicating a characteristic of electronic apparatus embodying a plurality of electrodes, means to connect said apparatus in an operative circuit which includes a load applied to the output electrodes of said apparatus and whose parameters are proportioned to simulate substantially the circuit parameters with which said apparatus is to be ultimately utilized, means to apply an electrical wave of certain frequency to the input electrodes of said apparatus so that the certain wave is reproduced across said load, means to impress a biasing voltage of varying magnitude and polarity on a preselected electrode of said apparatus, and means to utilize the reproduced certain wave across said load to indicate continuously the characteristic of said apparatus, comprising gain versus biasing voltage with reference to said preselected electrode and the parameters of said circuit means.

2. In combination, in a device for ascertaining a characteristic of an electronic apparatus embodying a plurality of electrodes, means to connect said apparatus in an operative circuit which includes a load applied to the output electrodes of said apparatus and whose parameters are proportioned to simulate substantially the circuit parameters with which said apparatus is to be ultimately employed, means to apply an electrical wave of certain frequency to the input electrodes of said apparatus so that the certain wave is reproduced across said load, means to apply to a preselected electrode of said apparatus a biasing voltage varying over a predetermined magnitude of positive and negative polarities, a cathode ray oscilloscope including a pair of vertical deflecting plates, and circuit means to connect said load to said deflecting plates whereby the certain wave reproduced in said load is utilized for continuously indicating on said oscilloscope the gain versus biasing voltage characteristic of said apparatus, with respect to said preselected electrode and the parameters of said circuit means.

3. In combination, in a device for ascertaining a characteristic of an electron discharge apparatus embodying a plurality of electrodes, means to connect said apparatus in a circuit which includes a load applied to the output electrodes of said apparatus and whose parameters are proportioned to simulate substantially the circuit parameters with which said apparatus is to be ultimately employed, means to apply an electrical wave of certain frequency to the input electrodes of said apparatus so that the certain wave is reproduced across said load, means to apply a preselected electrode of said apparatus one portion of a biasing voltage having a different frequency and varying in both magnitude and polarity, and means responsive to both the certain wave reproduced across said load and another portion of the biasing voltage to indicate continuously the apparatus characteristic comprising gain versus biasing voltage, with reference to said preselected electrode and the parameters of said circuit means.

4. In combination, in a device for ascertaining a characteristic of electron discharge apparatus embodying a plurality of electrodes, two sources of electrical waves of different frequencies, indicating means comprising a cathode ray tube embodying two pairs of electrodes for deflecting the cathode ray beam in two different directions, means to connect said apparatus in an operative circuit which includes a load applied to the output electrodes of said apparatus and whose parameters are proportioned to simulate approximately the circuit parameters with which said apparatus is to be ultimately used, two electrical paths extending between said two wave sources and said indicating means, one of said two paths including in sequence said two wave sources connected in series to the input electrodes of said apparatus, said circuit means embodying said apparatus and load, and one of said pairs of deflecting electrodes, and the other of said two paths including one of said wave sources and the other of said pairs of deflecting electrodes.

5. A system for indicating a characteristic of electron discharge apparatus embodying a plurality of electrodes including an anode, comprising means to connect said apparatus in a circuit which includes a load applied to the output electrodes of said apparatus and whose parameters are proportioned to simulate approximately the circuit parameters with which said apparatus is to be ultimately used, the magnitude of the alternating current resistance of said load being made small relative to the magnitude of the internal alternating current resistance of said anode, a source of an electrical wave of certain frequency applied to the input electrodes of said apparatus so that the certain wave is reproduced across said load, means to apply one portion of a biasing voltage of varying magnitude and polarity to one electrode of said apparatus, and means to utilize simultaneously both the certain wave reproduced across said load and the other portion of the biasing voltage to indicate continuously the transconductance versus biasing voltage characteristic of said apparatus, with reference to said one electrode and the parameters of said circuit means.

6. A system for indicating a characteristic of multi-electrode electronic apparatus embodying a plurality of electrodes including a control electrode, comprising means to connect said apparatus in a circuit which includes a load applied across the output electrodes of said apparatus and whose parameters are proportioned to simulate approximately the circuit parameters with which said apparatus is to be ultimately utilized, means to apply an electrical wave of certain frequency to the input electrodes of said apparatus so that the certain wave is reproduced across said load, means to apply one portion of a biasing voltage of varying magnitude and polarity to said control electrode, and means to utilize both the certain wave reproduced across said load and another portion of the biasing voltage for said control electrode to indicate continuously the gain versus control electrode biasing voltage characteristic of said apparatus, with reference to the parameters of said circuit means.

7. A system for indicating the cathode efficiency characteristic of electron discharge apparatus embodying a cathode, a heater therefor, a control grid, and an anode, comprising means to connect said apparatus in a circuit which includes a load applied across said cathode and anode and whose parameters are proportioned to simulate approximately the circuit parameters with which said apparatus is to be ultimately utilized, means to apply an electrical wave of certain frequency across said control grid and cathode so that the certain wave is reproduced across said load, means to apply to said control grid one portion of a biasing voltage of varying magnitude and polarity, means to energize said heater with a direct voltage of varying magnitude, and means to utilize the certain wave reproduced across said load and another portion of the control grid biasing voltage for indicating continuously the gain versus control grid voltage characteristic of said apparatus with reference to the varying energization of said heater and the parameters of said circuit means, the gain of said apparatus being a function of the heater energizing voltage.

8. A system for indicating the characteristic of an electrical discharge apparatus embodying a plurality of electrodes comprising means to connect said apparatus in a circuit which includes a load applied to the output electrodes of said apparatus and whose parameters are proportioned to simulate substantially the circuit parameters with which said apparatus is to be ultimately utilized, an oscilloscope embodying a fluorescent screen, a cathode ray beam and individual pairs of horizontal and vertical deflecting plates, a source of an electrical wave of certain frequency, further circuit means to apply said certain source to the input electrodes of said apparatus so that the certain wave is reproduced across said load, a source of an electrical wave having a different frequency and varying in both magnitude and polarity, other circuit means to apply one portion of the different wave to a preselected electrode, and additional circuit means to apply the certain wave reproduced in said load to said vertical deflecting plates and another portion of the different wave to said horizontal deflecting plates in such timed relation that said electron beam produces on said screen a wavy trace which persists as a standing wave along a horizontal axis to indicate continuously the gain versus different wave characteristic of said apparatus, with respect to said preselected electrode and the parameters of said circuit means.

9. A system for continuously indicating an electrical characteristic of an electron discharge apparatus embodying a plurality of electrodes including a control electrode, comprising means to connect said apparatus in a circuit which includes a load connected to the output electrodes of said apparatus and whose parameters are proportioned to simulate substantially the circuit parameters with which said apparatus is to be ultimately utilized, means to apply an electrical wave of certain frequency to the input electrodes of said apparatus so that the certain wave is reproduced across said load, means to bias the control electrode of said apparatus with one portion of an electrical voltage having a different frequency and varying in both magnitude and polarity, an oscilloscope embodying a cathode ray beam, a fluorescent screen and two pairs of deflecting plates for moving said beam on said screen in different directions, further circuit means to apply the certain wave reproduced in said load to one pair of said deflecting plates, and other circuit means to apply another portion of the different electrical voltage to another pair of said deflecting plates so that movements of said beam on said screen describe substantially a standing pattern involving gain versus control electrode biasing voltage characteristic of said apparatus, with reference to the parameters of said circuit means.

10. A system for indicating an electrical characteristic of electron discharge apparatus including a control electrode, a screen electrode, a suppressor electrode, and an anode, comprising means to connect said apparatus in a circuit which includes a load applied to the input electrodes of said apparatus and whose parameters are proportioned to simulate substantially the circuit parameters with which said apparatus is to be ultimately utilized, an oscilloscope embodying a fluorescent screen, a cathode ray beam, and horizontal and vertical deflecting plates, means to apply an electrical wave of certain frequency to the input electrodes of said apparatus so that the certain wave is reproduced across said load, a source of an electrical wave having a different frequency and varying in both magnitude and polarity, further circuit means to apply to a preselected electrode one portion of the different wave, other circuit means to apply the certain wave reproduced in said load to said vertical deflecting plates, and additional circuit means to apply another portion of the different wave to said horizontal deflecting plates, said beam being caused to trace continuously on said screen a standing wave indicating the apparatus characteristic, comprising gain versus the different wave, with reference to said preselected electrode and the parameters of said circuit means.

11. The system according to claim 10 in which the one portion of the different wave is applied to said control electrode and said beam traces the gain versus different wave characteristic with reference to said control electrode.

12. The system according to claim 10 in which the one portion of the different wave is applied to said suppressor electrode, and said beam traces the gain versus different wave characteristic with reference to said suppressor electrode.

13. The system according to claim 10 in which the one portion of the different wave is applied to said screen electrode, and said beam traces gain versus different wave characteristic with reference to said screen electrode.

14. The system according to claim 10 in which the one portion of the different wave is applied to said anode, and said beam traces gain versus different wave characteristic with reference to said anode.

15. A system for indicating a characteristic of electron discharge apparatus embodying a plurality of electrodes including a control electrode and an anode, comprising means to connect said apparatus in a circuit which embodies a load applied to the output electrodes of said apparatus and whose parameters are proportioned to simulate approximately the circuit parameters with which said apparatus is to be ultimately utilized, an oscilloscope embodying a fluorescent screen, a cathode ray beam, and individual pairs of vertical and horizontal deflecting plates, means to apply to a preselected electrode of said apparatus one portion of a certain wave varying in both magnitude and polarity so that the certain wave is reproduced across said resistor, and circuit means to apply the certain wave reproduced across said load to the pair of vertical deflecting plates and another portion of the certain wave to the pair of horizontal deflecting plates so that said beam traces continuously on said oscilloscope screen a standing wave indicating the characteristic comprising anode current versus certain wave with reference to said preselected electrode and the parameters of said circuit means.

16. The system according to claim 15 in which said certain wave means applies said one portion of said certain wave to said control electrode, the value of the alternating current resistance of said load is substantially less than the value of the internal alternating current resistance of said anode, and said beam traces continuously on said oscilloscope screen the plate current versus control grid biasing voltage characteristic, when the positive voltage supplied to said anode is provided with a predetermined fixed magnitude.

EDWARD H. SHARKEY.